Aug. 22, 1961 — L. C. COTUNO — 2,997,710
DIRECTION FINDER EQUIPMENT
Filed June 10, 1957 — 2 Sheets-Sheet 1
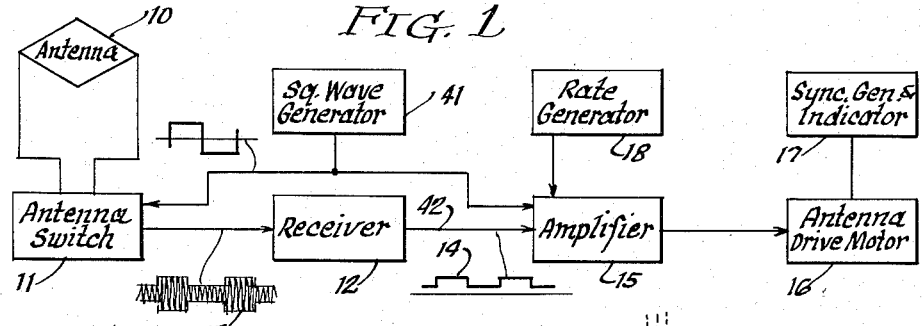
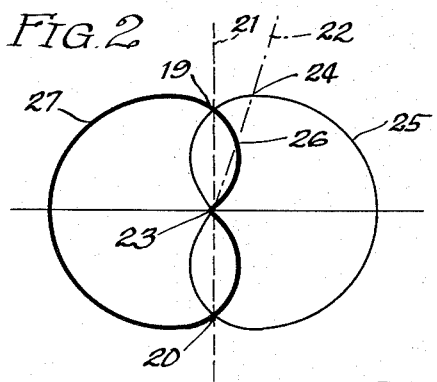
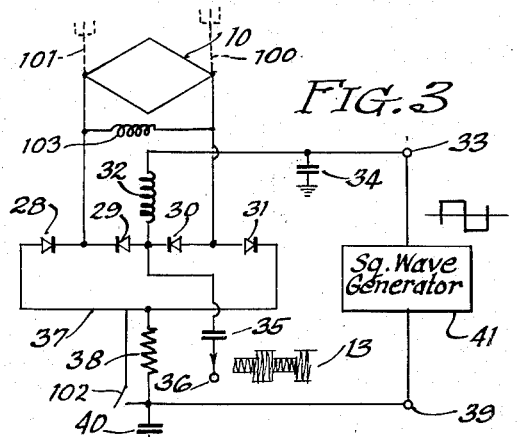
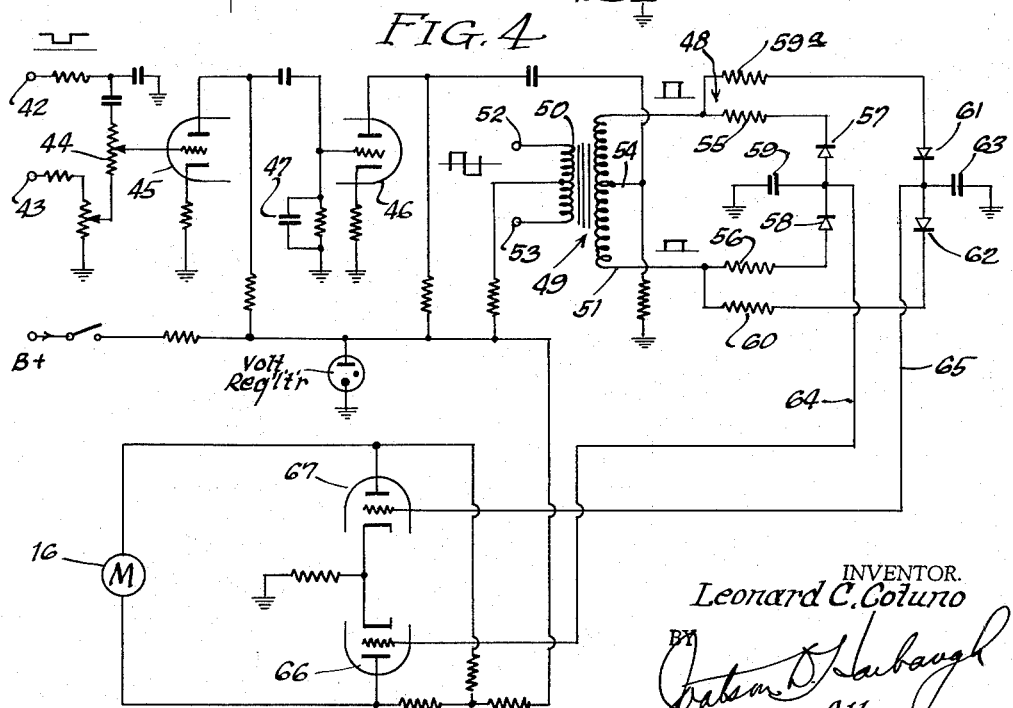
INVENTOR.
Leonard C. Cotuno
Attorney

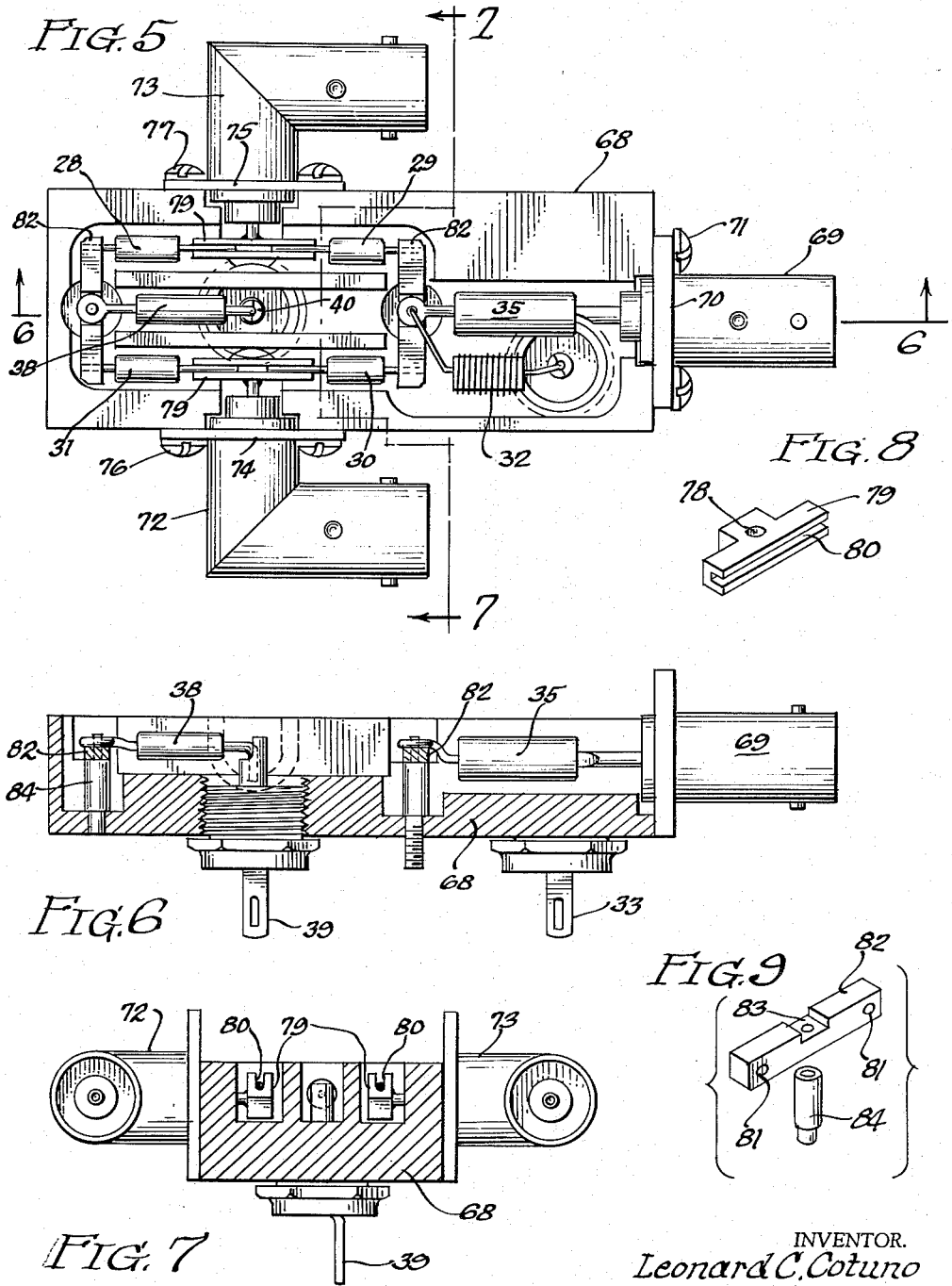

United States Patent Office 2,997,710
Patented Aug. 22, 1961

2,997,710
DIRECTION FINDER EQUIPMENT
Leonard C. Cotuno, Westchester, Ill., assignor to Webcor, Inc., Chicago, Ill., a corporation of Illinois
Filed June 10, 1957, Ser. No. 664,577
12 Claims. (Cl. 343—117)

This invention relates to direction finder equipment of the type operative to indicate relative bearing of radio signal sources and to "home" thereon, and more particularly to improvements in such equipment residing especially in the antenna block and lobe switch therefor, and in the synchronous filter and phase detector employed in conjunction therewith.

In the direction finder equipment that provides the environmental setting for the instant invention, a directional receiving antenna is employed which is a terminated element preferably rhombic, and having a cardioid field pattern. The antenna is mounted for rotation under the control of a motor, and a switching device of predetermined frequency is connected to the antenna and is effective to switch the termination and field patterns from end to end thereof and thereby modulate the incoming signal with a square wave of such predetermined frequency. Because of the directional properties of the antenna, the amplitude of the square wave modulation varies with the angle by which the antenna is off bearing from the point of origin of the radio signal source that it is receiving.

The antenna signal that is thus modulated, is fed to a receiver which filters the radio frequency carrier from the composite signal, and the remaining square wave is fed to an amplifier that includes as a part thereof a filter and phase detector or motor control circuit, and this circuit functions to rotate the antenna in a direction such that the radio signal source so received in each of the two cardioid field patterns, has the same strength, whereby the modulated square wave has equal amplitudes on both the positive and negative portions thereof. Consequently, no unbalanced voltage would be fed to the antenna motor from the control circuits thereof. The antenna would then remain in such adjusted position until it was no longer homing on the radio signal source, and correction would again be made by rotation thereof in either direction in accordance with the values of the modulated square wave pulses fed to the amplifier circuit.

In general operation then, the direction finder equipment functions in a manner similar to conventional equipment of this type and has, as is well understood, an indicator which may be associated with the antenna motor through a synchronous generator to show the relative bearing of the radio signal source with respect to the direction of movement of the vehicle (an aircraft, for example) receiving the signal source.

In the past, it has been conventional to provide a mechanical switch for alternately switching the termination and field patterns from end to end of the antenna, and also for filtering the modulated square wave pulses, in the amplifier, in synchronism with the antenna switching. Such a mechanical switching and filtering was often accomplished by using a vibrator operative to connect circuit elements, first in one direction and then in another, at the frequency of the vibrator. Systems of this type have serious disadvantages, especially where the direction finder equipment is employed in aircraft which are often subjected to violent movements and experience an extended range of temperatures in ordinary or normal use thereof. It is, accordingly, an object of this invention to provide direction finder equipment that is not subject to these disadvantages.

Another object of this invention is to provide non-mechanical switching devices that are far superior to their mechanical counterparts in that there are no moving parts which can possibly yield to difficulty under vibration or shock, and which will have maximum shock resistance that will approach and perhaps exceed a force of 50 G's. Still another object is in the provision of electrical switching devices that have great reliability and an effective operational life far in excess of that of any mechanical switching device.

Still another object is that of providing electric switching arrangements having particular utility in the environmental setting described, which are not subject to sharp temperature limitations and are, on the contrary, sufficiently independent thereof so as to function effectively through a temperature range of at least $-65°$ C. to $200°$ C. Yet another object of the invention is to provide switching devices of the type described that are also substantially independent of the humidity of their environments, and which in addition are not subject to dry circuit problems and do not necessitate then the use of extremely expensive and complex collateral equipment, whereby they have a relatively low cost.

A further object of the invention is in providing an antenna switching assembly having the components thereof arranged in an integral housing or carrier which may be mounted as a compact unit in an aircraft or other vehicle in which it is used, and arranged in circuit by making simple electric connections. Additional objects and advantages of the invention will become apparent as the specification develops.

An embodiment of the invention is illustrated in the accompanying drawings, in which—

FIGURE 1 is a block diagram showing the primary components of a direction finder system embodying the invention; FIGURE 2 is a diagrammatic view showing the cardioid field pattern of a directional antenna with which the invention may be used; FIGURE 3 is a schematic circuit diagram illustrating the antenna switching arrangement; FIGURE 4 is a schematic circuit diagram, showing the synchronous filter and phase detector switching arrangement which comprises a part of the amplifier; FIGURE 5 is a top plan view of the antenna switching assembly; FIGURE 6 is a longitudinal sectional view of the apparatus shown in FIGURE 5, and is taken substantially through the center thereof; FIGURE 7 is a vertical sectional view taken on the line 7—7 of FIGURE 5; FIGURE 8 is a perspective view of one of the connectors employed in the assembly of FIGURE 5; and FIGURE 9 is an exploded perspective view of another of the connectors employed in the assembly of FIGURE 5.

Referring first to FIGURE 1, it is seen that a directional antenna is shown and is denoted with the numeral 10. As heretofore stated, the antenna 10 is probably a rhombic antenna and has a cardioid field pattern, as shown in FIGURE 2. The antenna 10 is connected to an antenna switching assembly 11 which is operative to switch the termination of the field pattern from end to end of the antenna 10 and thereby modulate the incoming RF signal. The switch 11 is effective to impress a square wave having positive and negative components on the antenna 10, and preferably has a frequency of 100 cycles per second. However, any other suitable frequency may be employed, and the one preferred has been selected only because the audio value thereof does not have a disturbing effect on those using the equipment even if it should be, in some manner, heard thereby.

Thus, the composite signal being fed to the receiver 12 has the general appearance of the signal 13 in the sense that it is a RF carrier modulated by a square wave. The receiver 12 is effective to filter the RF carrier from the composite signal, with the result that the signal 14 being fed to the amplifier 15 is a square wave which may have some audio components. The amplifier 15 effectively amplifies the signal 14, filters the audio components therefrom and detects the phase of the signal in synchronism with the switch 11. Such synchronism may be achieved by exciting the phase detector in the amplifier 15 with a square wave generator 41 which is also connected to the switch 11, as shown. The resultant signal is then impressed on an antenna drive motor 16, and in accordance with the phase of any unbalanced signal impressed thereon, rotates the antenna 10 until it homes on the incoming radio signal whereupon there is no unbalanced signal output from the amplifier 15, and the antenna drive motor 16 then remains stationary. The relative bearing of the incoming radio signal source as detected by the antenna 10 is converted into intelligible indicia by an indicator 17 which may be fed through a synchronous generator arranged with the antenna drive motor. Preferably, a rate generator 18 also driven by the antenna drive motor 16, feeds a damping voltage to the amplifier 15 to prevent excessive hunting of the antenna 10.

The cardioid field pattern of the antenna 10 is illustrated in FIGURE 2, and is seen to have two cross-over points 19 and 20 phased 180° apart. The null position of the antenna is along the dotted line 21 which extends through the cross-over points 19 and 20, and the antenna will home on any signal oriented along the line 21 which originates forwardly, or upwardly in the illustration of FIG. 2, of the cross-over point 19. Without further description, it will be apparent that a signal source originating off of the line 21 will have different values as, for example, a signal being received at the outer extremity of the line 22. The ratio of the signal strengths will be in proportion to the distance from the center point 23 to the point 24 on cardioid pattern 25, and the distance between the point 23 and the point 26 on the cardioid pattern 27. These relative distances are identical, as brought out before, only when the signal extends from the center point 23 through the cross-over point 19.

The antenna switch comprising a part of this invention will now be described with reference to FIGURE 3, which shows that the antenna 10 has the opposite ends thereof connected respectively between the juncture of facing or oppositely oriented diodes 28 and 29, and the juncture of the oppositely oriented or reversely facing diodes 30 and 31. The diodes 29 and 30 are connected together in the same orientation, and at their point of connection are connected to one side of a filter choke 32 having the other side thereof connected to a terminal 33 which is grounded through a filter capacitance 34. These same diodes are also connected to a blocking capacitance 35 which is connected to an output terminal 36. The inlet side of diode 28 and outlet side of diode 31 are connected together through a line 37 and to one side of a terminating resistor 38, having the opposite end thereof connected to a terminal 39 and grounded through a filter capacitor 40. The terminals 33 and 39 are connected across a square wave generator, which is shown in block form and is designated with the numeral 41.

Preferably, the bias on the diodes 28 through 31 is maintained at about 100 millivolts, and they operate within the linear region of their conductivity curves, so that the incoming signal rides above and below the particular bias point. The D.C. flow path through the switching circuit on the positive portions of the square wave output of the generator 41 is through the terminal 33, choke coil 32, diode 29, antenna 10, diode 31, resistance 38, and back to the generator through terminal 39. On the negative portions of the square wave, the D.C. flow path is generally in the reverse direction—through terminal 39 and resistor 38, diode 28, antenna 10, diode 30, choke coil 32 and terminal 33. The modulated signal from the antenna 10 is fed through capacitance 35 to the terminal 36—the capacitance functioning to block audio frequency, but acting as a direct short or flow path for the radio frequencies herein employed which are above 200 megacycles. The signal appearing at the terminal 36 is a composite signal having a RF carrier component and a square wave superimposed thereon, and will have the general appearance of the signal 13. If the antenna 10 is at its null point, or is homing on the radio signal source, the positive and negative components of the composite signal 13 will have the same value. Otherwise, one will exceed the other in amplitude.

The composite signal 13 is fed from the terminal 36 to the receiver 12, which removes the RF component from the signal and delivers it to the amplifier 15 through the input terminal 42, which is shown in FIGURE 4. This signal, together with a damping voltage delivered to the terminal 43 from the rate generator 18, are fed through circuit elements shown in FIGURE 4 (including a potentiometer 44) to the control grid of an amplifier tube 45. The signal appearing on the anode of the tube 45 is coupled to the control grid of a second amplifier stage 46 through appropriate circuit elements, and if desired, a filter capacitor 47 may comprise a part of the coupling circuit.

The output which is taken from the anode of the amplifier stage 46 is fed to a synchronous filter and phase detector, designated in general with the numeral 48. The filter detector 48 comprises a coupling transformer 49 having a primary winding 50 and a secondary winding 51. The primary winding is connected through the terminals 52 and 53 thereof to a source of square wave excitation which provides square waves in identical synchronism with those fed to the switch 11, and preferably are provided by the square wave generator 41, as shown in FIGURE 1. The primary 50 is tapped and is used to supply B+ voltage to the generator 41. The secondary winding 51 has a center tap 54 to which the signal from the anode of the amplifier 46 is coupled. The opposite ends of the secondary 51 are connected together through the respective resistors 55 and 56 and diodes 57 and 58. These diodes are oriented in the same direction, and are connected together and to one side of a charging capacitor 59 which is grounded on the other side thereof.

The opposite ends of the secondary winding 51 are also connected together through the respective resistors 59a and 60 and diodes 61 and 62, which are oriented so as to permit current flow therethrough in the same direction, and at their point of connection are coupled to a charging capacitor 63 which has the other side thereof grounded. Thus, the diode circuits comprising the respective diodes 57—58 and 61—62 are in substantial parallelism, and are oriented so that current flows therethrough in opposite directions. The respective points of juncture of these paired diodes are connected through leads 64 and 65 to the respective control grids of amplifier tube stages 66 and 67 which have the respective anodes thereof connected to the antenna drive motor 16.

The circuit 48 functions as a filter and phase detector so as to provide output signals for application to the antenna motor 16, which will cause rotation thereof in either direction as necessary to swing the antenna 10 into homing position on the radio signals being received thereby. The excitation bias for the circuit synchronizes it with the switching frequency of the antenna switching circuit, and during one portion of the A.C. biasing pulse current flows through the resistor 59a, diodes 61 and 62, resistor 60, and through the secondary winding, whereupon the capacitor 63 charges. When the biasing pulse is of opposite polarity, the current flow is through the resistor 56, diodes 58 and 57, resistor 55, and through the secondary winding, whereupon the capacitance 59 is charged. The current flow in either of these diode circuits is increased in proportion to the magnitude of the signal fed to the center tap of the secondary winding, thereby affecting the charge assumed by the capacitors 59 and 63. These two charging capacitors are connected to the amplifier stages 66 and 67, and if the voltages supplied to the control grids thereof are balanced, the antenna motor 16 is not caused to rotate for there is no dissimilar current flow therethrough. On the other hand, if the charge assumed by either the capacitor 59 or 63 is in excess of that attained by the other, there will be a dissimilarity in the current flow in the anode circuits of the amplifier tubes 66 and 67 whereupon the antenna motor 16 will be caused to rotate, and its direction of rotation will be dependent upon the anode circuit which has the superior current flow therethrough.

The charge of the capacitors 59 and 63 will depend upon the value of the modulated square waves which comprise a part of the composite signal 13. That is to say, if the antenna is in its null or homing position, both the positive and negative portions of the square wave will have the same degree of modulation, with the end result that there will be no dissimilarity in the charges obtained by the capacitors 59 and 63, and the antenna motor 16 will then remain stationary. On the other hand, if the antenna 10 is not in its homing or null position, either the positive or the negative portion of the square wave signal imposed thereon will have a greater amplitude modulation than the other, and as a consequence, the charges assumed by the capacitors 59 and 63 will be different. The result then will be a different current flow value through the anode circuits of the amplifiers 66 and 67, and the antenna motor will be energized in a direction causing the antenna to swing to a null or homing position.

The circuit components shown schematically in FIGURE 3, are illustrated mechanically in FIGURES 5 through 7 and are shown mounted in a housing or antenna block 68 having a plurality of cavities or interconnected channels or passages therein adapted to receive such components. These components are designated in FIGURES 5 through 7 with the same numerals employed in connection with the description of FIGURE 3. When assembled, the block or housing 68 is adapted to be mounted as an integral unit, and the necessary connections thereto may be made quickly and without difficulty. To facilitate this result, the terminals 33 and 39 (as shown in FIGURE 6) depend from the housing 68 so as to afford free access thereto. The terminal 36 is connected to a coaxial conductor 69 by clamping a connector plate 70 to the housing by means of cap screws 71. Similarly, the opposite ends of the antenna 10 are connected in the circuit by securing the end portions of the coaxial elements 72 and 73 to the housing by means of the respective clamping plates 74 and 75 and cap screws 76 and 77.

The center conductor of each of the elements 72 and 73 is inserted into an opening 78 provided in the respective terminal elements 79, shown in detail in FIGURE 8. Each of the elements 79 is provided with a slot or channel 80 extending longitudinally thereof which receives therein one of the leads of the various diodes 29 through 31, as shown clearly in FIGURE 5. The opposite end leads of the respective diodes are received within the openings 81 which are provided at the opposite ends of the respective terminal elements 82 which have a central notch or recess 83 therein used to electrically connect one end of the capacitor 34 and terminating resistor 38 to the diodes. The terminal elements 82 are supported within the channels therefor in the housing 68 on standards or pins 84 which have restricted lower ends received within bores provided therefor in the housing.

In those instances where two single ended type antennas, such as one-half wave or one-quarter wave type, for example, are employed as indicated at 100 and 101 in FIG. 3, the diamond shaped or slot antenna 100 is disconnected. The high impedance choke 103 then becomes effective and the resistor 38 is shorted by a switch connection 102 with the result that the performance of the remaining circuit as already described is the same and thus can be used for other purposes such as determining direction, altitude and range depending upon the characteristics of antennas 100 and 101.

The entire unit is readily assembled because of the simple connections afforded for the various components, and when assembled is just as simply mounted within the vehicle that carries the same and connected to the remaining circuit of the direction finder equipment. It may be noted that while the switching circuits have been described with particular reference to a direction finder arrangement, the electronic switches may be employed in other circuit environments and will have especial utility wherever the desirable attributes thereof brought out hereinbefore are requisite.

While in the foregoing specification embodiments of the invention have been described in considerable detail with respect to its components and operation, it will be readily understood by those skilled in the art that changes may be made therein without departing from the spirit and principles of the invention.

I claim:

1. In a direction finding system having a terminated, directional antenna and a drive motor for rotating the same, an electronic antenna switching circuit connected with said antenna for cyclically switching the termination and field patterns from end to end thereof, means associated with said switching circuit for developing a square wave of predetermined frequency having positive and negative portions, said switching circuit being operative in its switching function to feed the positive and negative portions of such pulses to the respective ends of said antenna, and a motor control circuit connected with said motor for selectively energizing the same in opposite directions to effectuate corresponding movements of said antenna, said motor control circuit comprising an electronic phase detector for determining differences in the signals delivered from opposite ends of said antenna and for energizing said motor in the direction corresponding to the superior of those signals, and means for synchronizing said phase detector with the cyclic switching function of said switching circuit.

2. In a radio signal direction finder system, a terminated, directional antenna having one particular orientation with respect to a source of such radio signals received thereby that establishes the location thereof, a switching circuit connected to said antenna, a square wave generator coupled to said switching circuit for feeding square waves of predetermined frequency thereto, said switching circuit being completely electronic and being operative to switch the termination and field patterns of said antenna from end to end thereof and thereby modulate such incoming radio signals with square waves at the frequency thereof, a reversible motor connected with said antenna for selectively turning the same in opposite directions to position the same in the aforesaid one orientation that locates the source of such radio signals, a completely electronic motor control circuit comprising a phase detector and synchronizing means therefor including said square-wave generator to synchronize the phase detector at the frequency thereof, and means connecting said phase detector with said motor for directionally impressing any unbalanced output of the phase detector thereon to effect rotation of the motor in a direction corresponding to that of such unbalanced output, said phase detector being operative to develop an unbalanced output selectively in one direction or another in accordance with any superiority in one or the other of said signals delivered by the opposite ends of said antenna when the antenna is in a position other than the aforesaid one orientation.

3. The system of claim 2 in which said antenna is rhombic and has a cardioid field pattern.

4. The system of claim 2 in which said switching circuit comprises a plurality of rectifier elements arranged in connected pairs, the rectifiers in each of said pairs being oriented to permit current to flow therethrough in opposite directions, and in which one pair is oriented to permit current to flow through the respective rectifiers toward the point of connection therebetween and another pair of rectifiers are oriented to permit current to flow through the respective rectifiers away from the point of connection therebetween.

5. The system of claim 4 in which said rectifiers are diodes, and in which said antenna has the opposite ends thereof connected respectively between the diodes comprising each of the respective pairs.

6. The system of claim 2 in which said last mentioned means comprise a pair of amplifier tubes having the respective control grids thereof connected with said phase detector and the anodes thereof connected to said motor.

7. The system of claim 2 in which said phase detector comprises a pair of parallel circuits each having unidirectional current flow devices therein and a charging capacitor, and in which said capacitors are connected with said motor by said last mentioned means.

8. The system of claim 7 in which said synchronizer means comprises a transformer having primary and secondary windings, said secondary winding being connected to said parallel circuits and said primary winding being connected across said square wave generator.

9. In a phase detection circuit, a transformer having a primary winding adapted to be connected to an alternating signal source and a secondary winding adapted to have an input signal impressed thereon synchronously related to said alternating signal source, a pair of parallel rectifier circuits connected across said secondary and having respectively rectifier elements therein oriented to define oppositely directed current flow patterns through the respective parallel circuits, each of said parallel circuits having a charging capacitance therein, and separate circuit means connected respectively to said charging capacitances for coupling a charge differential between said charging capacitances to an external device.

10. In a circuit adapted to detect the phase and potential difference between portions of an incoming signal, a transformer having a primary winding adapted to be connected to an alternating signal source synchronously related to such incoming signal and a secondary winding adapted to have such incoming signal impressed thereon, a first rectifier circuit connected across said secondary and having a pair of diodes therein oriented to permit current to flow through such circuit in one predetermined direction, a second rectifier circuit connected across said secondary winding and having a pair of diodes therein oriented to define a current flow therethrough opposite to that of the aforesaid direction, each of said rectifier circuits having a charging capacitance connected thereto at the point of juncture between the respective diodes therein, and separate circuit means connected respectively to said charging capacitances for coupling a charge differential between said charging capacitances to an external device.

11. The circuit of claim 10 in which said secondary is equipped with a center tap adapted to be connected to such input signal.

12. The circuit of claim 10 in which a pair of inversely connected amplifier tubes have the control grids thereof connected respectively with said circuit means, the anodes of said amplifier tubes being adapted to be connected to a current energized external device to actuate the same with a current flow therethrough in a direction determined by an unbalanced condition of said amplifier tubes.

References Cited in the file of this patent

UNITED STATES PATENTS

| | | |
|---|---|---|
| 2,003,933 | Greig | June 4, 1935 |
| 2,257,203 | Thacker | Sept. 30, 1941 |
| 2,276,235 | Lamb | Mar. 10, 1942 |
| 2,360,810 | Carlson et al. | Oct. 17, 1944 |
| 2,397,128 | Cole | Mar. 26, 1946 |
| 2,469,970 | Lear | May 10, 1949 |
| 2,478,700 | Lindenblad | Aug. 9, 1949 |
| 2,487,601 | Schnoor et al. | Nov. 8, 1949 |
| 2,489,270 | Cole | Nov. 29, 1949 |
| 2,521,423 | Sutck | Sept. 5, 1950 |
| 2,544,653 | Browder | Mar. 13, 1951 |
| 2,630,526 | Zelov | Mar. 3, 1953 |
| 2,829,365 | Troost et al. | Apr. 1, 1958 |
| 2,901,748 | Sirons | Aug. 25, 1959 |